US012747837B2

(12) United States Patent
Van Bommel et al.

(10) Patent No.: US 12,747,837 B2
(45) Date of Patent: Sep. 29, 2026

(54) LASER-PHOSPHOR BASED STAGE-LIGHTING FIXTURE PROVIDING CTT CONTROL

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/122,811

(22) PCT Filed: Oct. 16, 2023

(86) PCT No.: PCT/EP2023/078678
§ 371 (c)(1),
(2) Date: Apr. 21, 2025

(87) PCT Pub. No.: WO2024/083743
PCT Pub. Date: Apr. 25, 2024

(65) Prior Publication Data
US 2026/0146728 A1 May 28, 2026

(30) Foreign Application Priority Data
Oct. 21, 2022 (EP) .................................... 22202939

(51) Int. Cl.
*F21V 9/14* (2006.01)
*F21V 9/32* (2018.01)
(Continued)

(52) U.S. Cl.
CPC .................. *F21V 9/14* (2013.01); *F21V 9/32* (2018.02); *F21V 9/40* (2018.02); *F21Y 2115/30* (2016.08)

(58) Field of Classification Search
CPC ................ F21V 9/14; F21V 9/32; F21V 9/40
See application file for complete search history.

(56) References Cited

U.S. PATENT DOCUMENTS

2007/0146639 A1* 6/2007 Conner ................. G03B 33/12 353/20
2012/0140183 A1 6/2012 Tanaka et al.
(Continued)

FOREIGN PATENT DOCUMENTS

CN 103913936 B 12/2016
CN 107272312 A 10/2017
(Continued)

*Primary Examiner* — Alexander K Garlen

(57) ABSTRACT

The invention provides a light generating system (1000) comprising a first light generating arrangement (2100), a luminescent body (210), a reflective polarizer (500), and a control system (300); wherein the first light generating arrangement (2100) is configured to generate pump light (2101) having a controllable polarization, wherein the polarization is controllable between a first polarization and a second polarization; wherein the first light generating arrangement (2100) comprises a first solid state light source (10) selected from the group comprising a superluminescent diode and a laser diode; wherein the luminescent body (210) comprises a luminescent material (200); wherein the luminescent body (210) is configured to (a) transmit at least part of the pump light (2101) (comprising the first polarization and/or the second polarization) and (b) convert at least part of the pump light (2101) (comprising the first polarization and/or the second polarization) into luminescent material light (201); wherein the reflective polarizer (500) is configured downstream of the luminescent body (210); wherein the reflective polarizer (500) is transmissive for at least part of the luminescent material light (201); wherein the reflective polarizer (500) has a higher transmission for the pump light (2101) comprising the first polarization than for the
(Continued)

pump light (2101) comprising the second polarization, wherein the reflective polarizer (500) has a lower reflectivity for the pump light (2101) comprising the first polarization than for the pump light (2101) comprising the second polarization; wherein the light generating system (1000) is configured to generate system light (1001); and wherein the control system (300) is configured to control spectral properties of the system light (1001) by controlling the polarization of the pump light (2101).

15 Claims, 4 Drawing Sheets

(51) Int. Cl.

| | |
|---|---|
| ***F21V 9/40*** | (2018.01) |
| ***F21Y 115/30*** | (2016.01) |

(56) References Cited

U.S. PATENT DOCUMENTS

| | | | |
|---|---|---|---|
| 2015/0092386 A1 | 4/2015 | Fellows-Demille et al. | |
| 2019/0313494 A1* | 10/2019 | Sweegers | H05B 45/00 |
| 2020/0192017 A1 | 6/2020 | Dülk et al. | |
| 2021/0156526 A1 | 5/2021 | Chen et al. | |

FOREIGN PATENT DOCUMENTS

| | | | | | |
|---|---|---|---|---|---|
| JP | 2019110084 | A | * | 7/2019 | B60Q 1/1423 |
| KR | 20130017460 | A | * | 2/2013 | F21V 9/40 |
| KR | 20220024570 | A | * | 3/2022 | G02B 19/0066 |
| WO | WO-2018001581 | A1 | * | 1/2018 | F21S 41/285 |
| WO | 2022034002 | A1 | | 2/2022 | |

* cited by examiner

LASER-PHOSPHOR BASED STAGE-LIGHTING FIXTURE PROVIDING CTT CONTROL

CROSS-REFERENCE TO PRIOR APPLICATIONS

This application is the U.S. National Phase application under 35 U.S.C. § 371 of International Application No. PCT/EP2023/078678, filed on Oct. 16, 2023, which claims the benefit of European Patent Application No. 22202939.9, filed on Oct. 21, 2022. These applications are hereby incorporated by reference herein.

FIELD OF THE INVENTION

The invention relates to a light generating system. The invention further relates to a lighting device comprising such system.

BACKGROUND OF THE INVENTION

US2021156526A1 describes a light source device which includes a laser light source for emitting a first light, a refractive optical element disposed on a light exiting path of the laser light source and configured to guide the first light to a light conversion device. The refractive optical element includes a light-exiting surface and light refracted by the light-exiting surface of the refractive optical element is deflected towards the light conversion device to exit. The light conversion device is disposed at a light-exiting side of the refractive optical element and the incident surface and light-exiting surface thereof are the same surface. The medium of the incident surface of the light conversion device has Brewster's angle of a and outgoing light of the refractive optical element is obliquely incident to the light conversion device at an incident angle of $\alpha-20°$ to $\alpha+10°$. Also, the light collecting device is disposed at the light-exiting side of the light conversion device and configured to collect light emitted from the light conversion device and then emit it.

CN107272312A discloses a lighting device comprising a first light source for emitting first light and a second light source for emitting second light. A light splitting apparatus receives the merged light, comprising the first light and the second light, and guides the first light and the second light for emission along a first light path and a second light path according to different transmission and reflection properties. A wavelength conversion apparatus receives the light emitted from the first optical path and converts the light into first converted light. A scattering apparatus scatters the light from the second optical path to diffused light. The diffused light and the converted light are combined and emitted by the lighting device.

WO2022/034002A1 discloses a light generating system comprising a light generating device for generating polarized laser radiation, a luminescent material layer, and optics. The luminescent material layer converts at least part of the polarized laser. The optics comprise first optics and second optics, wherein the first optics are configured to change the polarization of the polarized laser radiation and wherein the second optics have one or more of (i) a polarization dependent transmission and (ii) a polarization dependent reflection for the polarized laser radiation. The light generating device and the optics are configured such that, relative to an optical path of the luminescent material radiation emanating from the luminescent material, the second optics are configured downstream from the first optics and the luminescent material.

SUMMARY OF THE INVENTION

Applications such as stage lighting, stadium lighting, transport infrastructure, etc. may require using high intensity white light. Further, it is desired to have control over the spectral power distribution of the light provided by the light generating system and/or to control the correlated color temperature of the light provided. However, current devices may not be able to efficiently and relatively simply control the spectral power distribution (and the CCT) and/or may not be able to provide high powered lighting.

Hence, it is an aspect of the invention to provide a light generating system, which preferably further at least partly obviates one or more of above-described drawbacks. The present invention may have as object to overcome or ameliorate at least one of the disadvantages of the prior art, or to provide a useful alternative.

According to a first aspect, the invention provides a light generating system comprising a first light generating arrangement, a luminescent body, a reflective polarizer, and a control system. In embodiments the first light generating arrangement may be configured to generate pump light having a controllable polarization. Especially, the polarization may be controllable between a first polarization and a second polarization. Further, in embodiments, the first light generating arrangement may comprise a first solid state light source selected from the group comprising a superluminescent diode and a laser diode. The luminescent body is configured downstream of the first light generating arrangement and, during operation of the light generating system, the pump light generated by the first light generating arrangement is incident on the luminescent body. In embodiments, the luminescent body may comprise a luminescent material. Especially, the luminescent body may be configured to (a) transmit at least part of the pump light (comprising the first polarization and/or the second polarization) and (b) convert at least part of the pump light (comprising the first polarization and/or the second polarization) into luminescent material light. In embodiments, the reflective polarizer may be configured downstream of the luminescent body. Especially, the reflective polarizer may be transmissive for at least part of the luminescent material light. More especially, the reflective polarizer may have a higher transmission for the pump light comprising the first polarization than for the pump light comprising the second polarization. Further, in embodiments, the reflective polarizer may have a lower reflectivity for the pump light comprising the first polarization than for the pump light comprising the second polarization. In embodiments, the light generating system may be configured to generate system light. Especially, the system light may comprise white light having a correlated color temperature in a range from 1800 K to 10000 K and a color rendering index of at least 70. Furthermore, in embodiments, the control system may be configured to control spectral properties of the system light by controlling the polarization of the pump light. Hence, in specific embodiments the invention provides a light generating system comprising a first light generating arrangement, a luminescent body, a reflective polarizer, and a control system; wherein the first light generating arrangement is configured to generate pump light having a controllable polarization, wherein the polarization is controllable between a first polarization and a second polarization; wherein the first light generating arrangement comprises a first solid state light source selected from the group comprising a superluminescent diode and a laser diode; wherein the luminescent body comprises a luminescent material; wherein the luminescent body is configured to (a) transmit at least part of the pump light (comprising the first polarization and/or the second polarization) and (b) convert at least part of the pump light (comprising the first polarization and/or the second polarization) into luminescent material light; wherein the reflective polarizer is configured downstream of the luminescent body; wherein the reflective polarizer is transmissive for at least part of the luminescent material light; wherein the reflective polarizer has a higher transmission for the pump light comprising the first polarization than for the pump light comprising the second polarization, wherein the reflective polarizer has a lower reflectivity for the pump light comprising the first polarization than for the pump light comprising the second polarization; wherein the light generating system is configured to generate system light; wherein in embodiments the system light may be white light having a correlated color temperature in a range from 1800 K to 10000 K and a color rendering index of at least 70; and wherein the control system is configured to control spectral properties of the system light by controlling the polarization of the pump light. In a first operational mode of the light generating system the system light comprises a first radiant flux ratio $X_1/Y_1$ of the pump light and the luminescent material light, wherein in a second operational mode of the light generating system the system light comprises a second radiant flux ratio $X_2/Y_2$ of the pump light and the luminescent material light, and wherein $X_1/Y_1>X_2/Y_2$. The luminescent body is at least partially transparent for the pump light.

With the invention, high intensity white light may be provided. Furthermore, (only) by controlling the polarization of the pump light, the spectral distribution of the light provided by the light generating system may be controlled. Hence, in embodiments it may be possible to control the correlated color temperature (CCT) of the system light by controlling the polarization of the pump light. Further, the spectral power distribution of the system light may be controlled. In this way, the invention may provide in embodiments a laser-phosphor based stage-lighting fixture providing CCT control, and/or lighting for stage stadium lighting or transport infrastructure lighting.

As mentioned before, the invention provides a light generating system comprising in embodiments a first light generating arrangement, a luminescent body, a reflective polarizer, and a control system. Here below, embodiments of these elements are described in more detail.

The first light generating arrangement may be configured to generate pump light having a controllable polarization. The term polarization may refer to light comprising electromagnetic oscillations in a transverse wave of light along a particular direction. Hence, in embodiments, the pump light may be polarized in a desired direction of polarization. Furthermore, the polarization may especially be controllable between a first polarization and a second polarization. In embodiments, the first polarization is p polarization and the second polarization is s polarization. In other embodiments, however, it may be the other way around. The polarization may in embodiments be obtained by using a source of light that creates polarized light, or in embodiments by using a source of light in combination with polarization optics which imposes the desired polarization on the light generated by the source of light. Here below, some options are described.

The first light generating arrangement may in embodiments comprise a light source, especially a solid state light source. The term "light source" may in principle relate to any light source known in the art. It may be a conventional (tungsten) light bulb, a low pressure mercury lamp, a high pressure mercury lamp, a fluorescent lamp, an LED (light emissive diode). In a specific embodiment, the light source comprises a solid state LED light source (such as an LED or laser diode (or "diode laser")). The term "light source" may also relate to a plurality of light sources, such as 2-2000 (solid state) LED light sources. Hence, the term LED may also refer to a plurality of LEDs. Further, the term "light source" may in embodiments also refer to a so-called chip-on-board (COB) light source. The term "COB" especially refers to LED chips in the form of a semiconductor chip that is neither encased nor connected but directly mounted onto a substrate, such as a PCB. Hence, a plurality of light emitting semiconductor light source may be configured on the same substrate. In embodiments, a COB is a multi LED chip configured together as a single lighting module.

The term "light source" may also refer to a chip scaled package (CSP). A CSP may comprise a single solid state die with provided thereon a luminescent material comprising layer. The term "light source" may also refer to a midpower package. A midpower package may comprise one or more solid state die(s). The die(s) may be covered by a luminescent material comprising layer. The die dimensions may be equal to or smaller than 2 mm, such as in the range of e.g. 0.2-2 mm. Hence, in embodiments the light source comprises a solid state light source. Further, in specific embodiments, the light source comprises a chip scale packaged LED. Herein, the term "light source" may also especially refer to a small solid state light source, such as having a mini size or micro size. For instance, the light sources may comprise one or more of mini LEDs and micro LEDs. Especially, in embodiment the light sources comprise micro LEDs or "microLEDs" or "μLEDs". Herein, the term mini size or mini LED especially indicates to solid state light sources having dimensions, such as die dimension, especially length and width, selected from the range of 100 μm-1 mm. Herein, the term u size or micro LED especially indicates to solid state light sources having dimensions, such as die dimension, especially length and width, selected from the range of 100 μm and smaller.

The light source may have a light escape surface. Referring to conventional light sources such as light bulbs or fluorescent lamps, it may be an outer surface of a glass or a quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes from the light exit surface of the light source.

Likewise, a light generating device may comprise a light escape surface, such as an end window. Further, likewise a light generating system may comprise a light escape surface, such as an end window.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode (OLED), such as a passive-matrix (PMOLED) or an active-matrix (AMOLED). In a specific embodiment, the light source comprises a solid-state light source (such as an LED or laser diode). In an embodiment, the light source comprises an LED (light emitting diode). The terms "light source" or "solid state light source" may also refer to a superluminescent diode (SLED).

The term LED may also refer to a plurality of LEDs.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as an LED, or downstream of a plurality of solid-state light sources (i.e. e.g. shared by multiple LEDs). In embodiments, the light source may comprise an LED with on-chip optics. In embodiments, the light source comprises pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED. Such LEDs, which may not comprise a luminescent material ("phosphor") may be indicated as direct color LEDs.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as an LED with a luminescent material layer or dome comprising luminescent material. Such LEDs may be indicated as phosphor converted LEDs or PC LEDs (phosphor converted LEDs). In other embodiments, the luminescent material may be configured at some distance ("remote") from the light source, such as an LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be converted by the luminescent material.

In embodiments, the light generating device may comprise a luminescent material. In embodiments, the light generating device may comprise a PC LED. In other embodiments, the light generating device may comprise a direct LED (i.e. no phosphor). In embodiments, the light generating device may comprise a laser device, like a laser diode. In embodiments, the light generating device may comprise a superluminescent diode. Hence, in specific embodiments, the light source may be selected from the group of laser diodes and superluminescent diodes. In other embodiments, the light source may comprise an LED.

The light source may especially be configured to generate light source light having an optical axis (O), (a beam shape,) and a spectral power distribution. The light source light may in embodiments comprise one or more bands, having band widths as known for lasers.

The term "light source" may (thus) refer to a light generating element as such, like e.g. a solid state light source, or e.g. to a package of the light generating element, such as a solid state light source, and one or more of a luminescent material comprising element and (other) optics, like a lens, a collimator. A light converter element ("converter element" or "converter") may comprise a luminescent material comprising element. For instance, a solid state light source as such, like a blue LED, is a light source. A combination of a solid state light source (as light generating element) and a light converter element, such as a blue LED and a light converter element, optically coupled to the solid state light source, may also be a light source (but may also be indicated as light generating device). Hence, a white LED is a light source (but may e.g. also be indicated as (white) light generating device).

The term "light source" herein may also refer to a light source comprising a solid state light source, such as an LED or a laser diode or a superluminescent diode.

The term "light source" may (thus) in embodiments also refer to a light source that is (also) based on conversion of light, such as a light source in combination with a luminescent converter material. Hence, the term "light source" may also refer to a combination of an LED with a luminescent material configured to convert at least part of the LED radiation, or to a combination of a (diode) laser with a luminescent material configured to convert at least part of the (diode) laser radiation.

In embodiments, the term "light source" may also refer to a combination of a light source, like an LED, and an optical filter, which may change the spectral power distribution of the light generated by the light source. Especially, the term "light generating device" may be used to address a light source and further (optical components), like an optical filter and/or a beam shaping element, etc.

The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The term "solid state light source", or "solid state material light source", and similar terms, may especially refer to semiconductor light sources, such as a light emitting diode (LED), a laser diode, or a superluminescent diode.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" or "solid state material laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride (Sm:$CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate Nd:$YCa_4O(BO_3)_3$ or Nd:YCOB, neodymium doped yttrium orthovanadate (Nd:$YVO_4$) laser, neodymium glass (Nd:glass) laser, neodymium YLF (Nd:YLF) solid-state laser, promethium 147 doped phosphate glass (147$Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride (U:$CaF_2$) solid-state laser, Ytterbium doped glass laser (rod, plate/chip, and fiber), Ytterbium YAG (Yb:YAG) laser, $Yb_2O_3$ (glass or ceramics) laser, etc.

For instance, including second and third harmonic generation embodiments, the light source may comprise one or more of an F center laser, an yttrium orthovanadate (Nd: $YVO_4$) laser, a promethium 147 doped phosphate glass (147$Pm^{3+}$:glass), and a titanium sapphire (Ti:sapphire; $Al_2O_3$:$Ti^{3+}$) laser. For instance, considering second and third harmonic generation, such light sources may be used to generated blue light.

In embodiments, the terms "laser" or "solid state laser" or "solid state material laser" may refer to one or more of a semiconductor laser diodes, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light. Hence, in embodiments lasers in a laser bank (or "laser array bank") may share the same optics.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light.

The laser light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

The term "solid state material laser", and similar terms, may refer to a solid state laser like based on a crystalline or glass body dopes with ions, like transition metal ions and/or lanthanide ions, to a fiber laser, to a photonic crystal laser, to a semiconductor laser, such as e.g. a vertical cavity surface-emitting laser (VCSEL), etc.

The term "solid state light source", and similar terms, may especially refer to semiconductor light sources, such as a light emitting diode (LED), a laser diode, or a superluminescent diode. Instead of the term "solid state light source" also the term "semiconductor-based light source" may be applied. Hence, the term "semiconductor-based light source" may e.g. refer to one or more of a light emitting diode (LED), a laser diode, and a superluminescent diode. Hence, the light generating device may comprise one or more of a light emitting diode (LED), a laser diode, and a superluminescent diode.

Superluminescent diodes are known in the art. A superluminescent diode may be indicated as a semiconductor device which may be able to emit low-coherence light of a broad spectrum like an LED, while having a brightness in the order of a laser diode.

US2020192017 indicates for instance that "With current technology, a single SLED is capable of emitting over a bandwidth of, for example, at most 50-70 nm in the 800-900 nm wavelength range with sufficient spectral flatness and sufficient output power. In the visible range used for display applications, i.e. in the 450-650 nm wavelength range, a single SLED is capable of emitting over bandwidth of at most 10-30 nm with current technology. Those emission bandwidths are too small for a display or projector application which requires red (640 nm), green (520 nm) and blue (450 nm), i.e. RGB, emission". Further, superluminescent diodes are amongst others described, in "Edge Emitting Laser Diodes and Superluminescent Diodes", Szymon Stanczyk, Anna Kafar, Dario Schiavon, Stephen Najda, Thomas Slight, Piotr Perlin, Book Editor(s): Fabrizio Roccaforte, Mike Leszczynski, First published: 3 Aug. 2020 https://doi.org/10.1002/9783527825264.ch9 in chapter 9.3 superluminescent diodes. This book, and especially chapter 9.3, are herein incorporated by reference. Amongst others, it is indicated therein that the superluminescent diode (SLD) is an emitter, which combines the features of laser diodes and light-emitting diodes. SLD emitters utilize the stimulated emission, which means that these devices operate at current densities similar to those of laser diodes. The main difference between LDs and SLDs is that in the latter case, the device waveguide may be designed in a special way preventing the formation of a standing wave and lasing. Still, the presence of the waveguide ensures the emission of a high-quality light beam with high spatial coherence of the light, but the light is characterized by low time coherence at the same time" and "Currently, the most successful designs of nitride SLD are bent, curved, or tilted waveguide geometries as well as tilted facet geometries, whereas in all cases, the front end of the waveguide meets the device facet in an inclined way, as shown in FIG. 9.10. The inclined waveguide suppresses the reflection of light from the facet to the waveguide by directing it outside to the lossy unpumped area of the device chip". Hence, an SLD may especially be a semiconductor light source, where the spontaneous emission light is amplified by stimulated emission in the active region of the device. Such emission is called "super luminescence". Superluminescent diodes combine the high power and brightness of laser diodes with the low coherence of conventional light-emitting diodes. The low (temporal) coherence of the source has advantages that the speckle is significantly reduced or not visible, and the spectral distribution of emission is much broader compared to laser diodes, which can be better suited for lighting applications. Especially, with varying electrical current, the spectral power distribution of the superluminescent diode may vary. In this way the spectral power distribution can be controlled, see e.g. also Abdullah A. Alatawi, et al., Optics Express Vol. 26, Issue 20, pp. 26355-26364, https://doi.org/10.1364/OE.26.026355.

Especially, in embodiments the first light generating arrangement may comprise a first solid state light source selected from the group comprising a superluminescent diode and a laser diode. Note that in embodiments, lasers may provide light that may almost completely be polarized in a particular direction. However, in alternative embodiments, polarizing optical elements, such as polarizing filters, may (in addition) be used to polarize light in a desired polarization direction. Further, polarizing optical elements may be used to change a polarization. These features are discussed further below.

Further, the light generating system may comprises a luminescent body. The luminescent body is especially configured downstream of the first light generating arrangement. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Especially, the luminescent body may comprise a luminescent material. Especially, the luminescent body may be configured to (a) transmit at least part of the pump light (comprising the first polarization and/or the second polarization) and (b) convert at least part of the pump light (comprising the first polarization and/or the second polarization) into luminescent material light. The luminescent body may in embodiments be partially transmissive for light of certain wavelengths. Hence, a part of the pump light incident on the luminescent body may be transmitted without undergoing any conversion. Additionally, in embodiments, a part of the pump light may also undergo conversion to luminescent material light when incident on the luminescent body. By choosing the thickness of the luminescent body and the amount of luminescent material, the luminescent body may be configured such that part of the pump light is converted and part of the pump light is transmitted (this is known to a person skilled in the art, and may comply with the Lambert-Beer law). Hence, in this way, the light provided further downstream of the luminescent body may comprise a combination of both pump light as well as luminescent material light. These features are discussed in detail further below.

Yet further, the light generating system may comprises a reflective polarizer. In embodiments, the reflective polarizer may especially be configured downstream of the luminescent body. Especially, the reflective polarizer may be transmissive for at least part of the luminescent material light. In this way, luminescent material light generated in the luminescent body and propagating to the reflective polarized may at least partly be transmitted. In embodiments, the reflective polarizer may have a higher transmission for the pump light comprising the first polarization than for the pump light comprising the second polarization. Further, in embodiments, the reflective polarizer may have a lower reflectivity for the pump light comprising the first polarization than for the pump light comprising the second polarization.

Especially, a combination of (a) higher transmissivity and lower reflectivity for the pump light comprising the first polarization, and (b) lower transmissivity and higher reflectivity for the pump light comprising the second polarization may provide the benefit of allowing to control the spectral power distribution of the system light, especially the CCT, by controlling a ratio of pump light comprising the first polarization to pump light comprising the second polarization.

As indicated above, a part of the pump light may be transmitted through the luminescent body without undergoing a conversion to luminescent material light. Hence, especially, the (unconverted) pump light may be transmitted (through the luminescent body) and be incident on the reflective polarizer. As mentioned above, the reflective polarizer may have a higher transmission and lower reflectivity for pump light comprising the first polarization. Hence, a part of the pump light comprising the first polarization may especially be transmitted through the reflective polarizer. Analogously, in embodiments, the reflective polarizer may have a lower transmission and higher reflectivity for pump light comprising the second polarization. Hence, a part of the pump light comprising the second polarization may especially be reflected back upstream by the reflective polarizer. Reflection (at the reflective polarizer) of the pump light comprising the second polarization may be beneficial as the reflected pump light may especially be propagated again through at least part of the luminescent body. Hence, in this way, a part of the unconverted pump light comprising the second polarization, reflected at the reflective polarizer, may undergo a conversion to luminescent material light in a second pass through the luminescent body. A portion of the generated luminescent material light incident on the reflective polarizer may (also) be transmitted (as the reflective polarizer may be transmissive for luminescent material light; see also above).

In this way, by controlling the polarization of the pump light, the spectral power distribution of the light downstream of the reflective polarizer may be controlled. A relatively high percentage of first polarized pump light may e.g. lead to (system) light having a relatively high blue content, such as especially having a high CCT. A relatively high percentage of second polarized pump light may e.g. lead to (system) light having a relatively low blue content, such as especially having a low CCT. Hence, in embodiments, by controlling the polarization, the (relative) amount of luminescent material light (in the system light) outcoupled from the system may be increased or decreased.

However, in other embodiments, the reflective polarizer may (also) be configured such that the reflective polarizer may have a higher transmission for the pump light comprising the second polarization than for the pump light comprising the first polarization. Further, in embodiments, the reflective polarizer may have a lower reflectivity for the pump light comprising the second polarization than for the pump light comprising the first polarization. Hence, (also) in such embodiments, intensity and/or spectral composition of the light outcoupled from the system may especially be controlled by controlling the polarization of the generated pump light. Herein, however, especially the former embodiment(s) are discussed, i.e. (a) the reflective polarizer may have a higher transmission for the pump light comprising the first polarization than for the pump light comprising the second polarization, and (b) the reflective polarizer may have a lower reflectivity for the pump light comprising the first polarization than for the pump light comprising the second polarization. Note that in embodiments, the first polarization may be p-polarization and the second polarization may be s-polarization (or vice versa).

Especially, the light generating system may be configured to generate system light (i.e. the light outcoupled from the system). The system light may in an operational mode comprise luminescent material light and pump light. The spectral power distribution of the system light may thus in embodiments be controlled by controlling the polarization of the pump light. Hence, the light generating system may comprise a control system or may be functionally coupled to a control system (configured to control the system light). As can be derived from the above, controlling the system light may comprise controlling the polarization of the pump light and the radiant flux of the pump light. Especially with the former, the spectral power distribution of the system light may be controlled.

In embodiments, the control system may be configured to control (or operate in a mode of operation), the light generating system. The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, Thread, WIFI, LiFi, ZigBee, BLE or WiMAX, or another wireless technology.

The system, or apparatus, or device may execute an action in a "mode" or "operation mode" or "mode of operation" or "operational mode". The term "operational mode may also be indicated as "controlling mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, which can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In embodiments the control system (in an operational mode) may be configured to control spectral properties of the system light by controlling the polarization of the pump light. Hence, by controlling the polarization of the reflective polarizer with the control system, the color point, more especially the correlated color temperature (CCT), of the system light may be controlled. Here, CCT may be a numerical measure (measured in kelvin (K)) indicating the color of the light. Further, in relation to CCT, the term "white light", and similar terms, herein, is known to the person skilled in the art. It may especially relate to light having a correlated color temperature (CCT) between about 1800 K and 20000 K, such as between 2000 and 20000 K, especially 2700-20000 K, for general lighting especially in the range of about 2000-7000 K, such as in the range of 2700 K and 6500 K. Further, in embodiments, the system light may be white light and may have a correlated color temperature (CCT) in a range from 1800 K to 20000 K, such as in the range 1800 K to 10000 K, especially in the range 3000 K to 1000K. In embodiments, the system light may be white light having a correlated color temperature selected from a range from 1800 to 6500 K. Further, in embodiments, the system light may have a color rendering index of at least 70, more especially at least 80, such as at least 85, especially at least 90.

Especially, as explained above, when pumping with pump light comprising the first polarization, a ratio of the radiant flux of the pump light comprising the first polarization relative to the radiant flux of the luminescent material light (in the system light) may be higher than a ratio of the radiant flux of the pump light comprising the second polarization relative to the radiation flux of the luminescent material light (in the system light) when pumping with pump light comprising the second polarization. This may be the case because the reflective polarizer may in embodiments be (substantially) transmissive for pump light comprising the first polarization and (substantially) reflective for pump light comprising the second polarization.

A ratio of the first polarization and second polarization can be controlled by using a polarizer that can control the polarization. Hence, while not necessarily varying the radiant flux of the pump light upstream of the polarizer, the ratio of the pump light with the first polarization and the pump light with the second polarization can be controlled.

Alternatively (or additionally), (at least) two sources of light can be applied, wherein a first source of light, optionally in combination with a polarizer, provides the pump light with the first polarization, and wherein a second source of light, optionally in combination with a polarizer, provides the pump light with the second polarization. Hence, by controlling a ratio of the radiant flux of the two sources of light, the ratio of the pump light with the first polarization and the pump light with the second polarization can be controlled. Thereby, the polarization of the pump light is controlled.

In embodiments, the control system may be configured to control a radiant flux of the pump light (see further also below). This may also allow controlling the radiant flux of the system light.

As mentioned above, the light generating arrangement may generate pump light comprising the first polarization and/or the second polarization. Especially, the first polarization and the second polarization may be selected from p-polarization and s-polarization.

In embodiments, a primary first solid state light source may generate (first) polarized pump light. Further, in embodiments, the light generating arrangement may comprise a secondary first solid state light source, which may be used to generate pump light of a different polarization from the first light source (especially second polarized light). In embodiments, the primary first solid state light source and/or the secondary first solid state light source may (each) comprise a laser diode. Therefore, in embodiments, pump light of two different polarizations may be provided by using two laser diodes.

Alternatively (or additionally), in embodiments, polarizers may be used to polarize the pump light. Hence, in this way, the light generating arrangement may provide pump light of (multiple) desired polarizations. Therefore, the light generating arrangement may be used to generate pump light comprising a plurality of polarizations (for example, a combination of both p-polarized pump light and s-polarized pump light). Hence, the first light generating arrangement may comprise one or more solid state light sources which provide light that is polarized light, or a polarization may be imposed on the light that is provided by the one or more solid state light sources. In specific embodiments a primary first solid state light source may be applied to generate in combination with a (first) polarizer (first) polarized pump light. Further, in embodiments, the light generating arrangement may comprise a secondary first solid state light source, configured to generate in combination with a (second) polarized (second) polarized light. Hence, also in these embodiments pump light of two different polarizations may be provided, either with a single light source or comprise two or more light sources.

As can be derived from the above, in specific embodiments the first light generating arrangement may comprise (a) a first pump light source (or "primary first (solid state) light source") and (b) a second pump light source (or "secondary first (solid state) light source").

Therefore, in embodiments, the first light generating arrangement may comprise (a) a first pump light source (or "primary first light source") and (b) a second pump light source (or "secondary first light source"). Especially, the first pump light source, optionally in combination with first optics, may be configured to generate the pump light comprising the first polarization. Furthermore, in embodiments, the second pump light source may, optionally in combination with second optics, be configured to generate the pump light comprising the second polarization. Here, the first optics and/or the second optics may in embodiments be polaroid filters. Polaroid filters may especially convert unpolarized light to comprise a polarization in a specific orientation. The direction polarization may especially be controlled by controlling the orientation of the polaroid filter. Hence, in this way, the pump light comprising both a first polarization and a second polarization may be provided. Furthermore, in embodiments, the first pump light source and the second pump light source may each comprise a laser diode. Hence, in some embodiments, the light generating arrangement may also comprise two different laser diodes of different polarizations to provide pump light comprising both the first polarization and the second polarization. In specific embodiments, the first light generating arrangement comprises (a) a first pump light source and (b) a second pump light source; wherein the first pump light source, optionally in combination with first optics, is configured to generate the pump light comprising the first polarization, and wherein the second pump light source, optionally in combination with second optics, is configured to generate the pump light comprising the second polarization.

In embodiments, the first pump light source and/or the second pump light source may comprise a polarized light source i.e. the first pump light source and/or the second pump light source may provide polarized light. In such embodiments, additional polaroid filter (such as mentioned above) may be optional.

As mentioned above, the total radiant flux of the system light may especially be controlled by means of the control system. In embodiments, the control system may (also) be configured to control in an operational mode of the light generating system the correlated color temperature of the system light by controlling relative amounts of (a) the first radiant flux of the pump light comprising the first polarization and (b) the second radiant flux of the pump light comprising the second polarization to a total radiant flux of the pump light.

Especially, in specific embodiments the control system may be configured to reduce in an operational mode of the light generating system a total radiant flux of the pump light (comprising the first polarization and/or the second polarization) by increasing a relative amount of a second radiant flux of the pump light comprising the second polarization to the total radiant flux of the pump light. In this way, while decreasing the correlated color temperature, due to the fact that more pump light is being converted, also the radiant flux may be reduced. This may be a BBL dimming effect: higher radiant fluxes at higher CCTs and lower radiant fluxes at lower CCTs. The system light may in embodiments comprise a combination of luminescent material light and pump light (comprising both the first polarization and the second polarization). Therefore, in specific embodiments, the control system may be configured to reduce in an operational mode of the light generating system a total radiant flux of the pump light (comprising the first polarization and/or the second polarization) when increasing a relative amount of a second radiant flux of the pump light comprising the second polarization to the total radiant flux of the pump light. Likewise, the control system may be configured to increase in an operational mode of the light generating system a total radiant flux of the pump light (comprising the first polarization and/or the second polarization) when increasing a relative amount of a first radiant flux of the pump light comprising the first polarization to the total radiant flux of the pump light.

Herein, the term "first radiant flux" may refer to the radiant flux of the pump light comprising the first polarization and the term "second radiant flux" may refer to the radiant flux of the pump light comprising the second polarization.

Note that, in embodiments, increasing a second radiant flux of the pump light comprising the second polarization relative to the total radiant flux of the pump light may be analogous to increasing the ratio of the second radiant flux of the pump light comprising the second polarization to the first radiant flux of the pump light comprising the first polarization.

In specific embodiments, in a first operational mode of the light generating system the system light comprises a first radiant flux ratio $X_1/Y_1$ of the pump light and the luminescent material light, wherein in a second operational mode of the light generating system the system light comprises a second radiant flux ratio $X_2/Y_2$ of the pump light and the luminescent material light, and wherein $X_1/Y_1>X_2/Y_2$, more especially $X_1/Y_1\geq1.2*X_2/Y_2$. For instance, in embodiments $X_1/Y_1 1.5*X_2/Y_2$. Hence, in embodiments the first radiant flux ratio being larger than the second radiant flux may be indicative of a relatively higher CCT. As can be derived from the above, in specific embodiments $X_2/X_1<1$ may apply, such as $X_2/X_1\leq0.8$.

As mentioned above, the pump light generated by the first light generating arrangement may in embodiments be incident on the luminescent body configured downstream of the light generating arrangement. Especially, the luminescent material is comprised by a luminescent body.

The luminescent body may be a layer, like a self-supporting layer. The luminescent body may also be a coating. The luminescent body may also comprise a luminescent coating on a support (especially a light transmissive support in the transmissive mode, or a reflective support in the reflective mode). Especially, the luminescent body may essentially be self-supporting. In embodiments, the luminescent material may be provided as luminescent body, such as a luminescent single crystal, a luminescent glass, or a luminescent ceramic body. Such body may be indicated as "converter body" or "luminescent body". In embodiments, the luminescent body may be a luminescent single crystal or a luminescent ceramic body. For instance, in embodiments a cerium comprising garnet luminescent material may be provided as a luminescent single crystal or as a luminescent ceramic body. In other embodiments, the luminescent body may comprise a light transmissive body, wherein the luminescent material is embedded. For instance, the luminescent body may comprise a glass body, with luminescent material embedded therein. Or, the glass as such may be luminescent. In other embodiments, the luminescent body may comprise a polymeric body, with luminescent material embedded therein.

The luminescent body may have any shape. In general, however, the luminescent body may comprise two essentially parallel faces, defining a height (of the luminescent body). Further, the luminescent body may comprise an edge face, bridging the two essentially parallel faces. The edge face may be curved in one or two dimensions. The edge face may be planar. The luminescent body may have a rectangular or circular cross-section, though other cross-sections may also be possible, like e.g. hexagonal, octagonal, etc. Hence, the luminescent body may have a circular cross-section, an oval cross-section, square, or non-square rectangular. In embodiments, the luminescent body may have an n-gonal cross-section, wherein n is at least 3, like 4 (square or rectangular cross-section), 5 (pentagonal cross-section), 6 (hexagonal cross-section), 8 (octagonal cross-section) or higher. The two essentially parallel faces may also be indicated as "main faces", as they may especially provide the largest external area of the luminescent body. Perpendicular to the afore-mentioned cross-section, may be another cross-section, which may in embodiments be rectangular. Hence, the luminescent body may e.g. have a cubic shape, a (non-cubic) cuboid shape, an n-gonal prism shape with n being at least 5 (such as pentagonal prism, hexagonal prism), and a cylindrical shape. Other shapes, however, may also be possible. Especially, the luminescent body may have a cuboid shape, a cylindrical shape, or an n-gonal prism shape wherein n is 6 or 8.

In embodiments, the luminescent body (or "body") has lateral dimensions width or length (W1 or L1) or diameter (D) and a thickness or height (H1). In embodiments, (i) D≥H1 or (ii) and W1≥H1 and/or L1≥H1. The luminescent body may be transparent or light scattering. In embodiments, the luminescent body may comprise a ceramic luminescent material. In specific embodiments, L1≤10 mm, such as especially L1≤5 mm, more especially L1≤3 mm, most especially L1≤2 mm. In specific embodiments, W1≤10 mm, such as especially W1≤5 mm, more especially W1≤3 mm, most especially W1≤2 mm. In specific embodiments, H1≤10 mm, such as especially H1≤5 mm, more especially H1≤3 mm, most especially H1≤2 mm. In specific embodiments, D≤10 mm, such as especially D≤5 mm, more especially D≤3 mm, most especially D≤2 mm. In specific embodiments, the body may have in embodiments a thickness in the range 50 μm-1 mm. Further, the body may have lateral dimensions (width/diameter) in the range 100 μm-10 mm. In yet further specific embodiments, (i) D>H1 or (ii) W1>H1 and L1>H1. Especially, the lateral dimensions like length, width, and diameter are at least 2 times, like at least 5 times, larger than the height. In specific embodiments, the luminescent body has a first length L1, a first height H1, and a first width W1, wherein H1≤0.5*L1 and H1≤0.5*W1.

In embodiments, the luminescent body may comprises a first face, a second face, and a side face bridging the first face and the second face. The first face and the second face may also be indicated as main faces. In the case of a cylindrical shape, the side face may be a single side face. In the case of a cuboid, the side face may comprise four facets. In the case of a hexagonal prism the side face may comprise six facets.

Especially, the luminescent body may be configured in the transmissive mode. In the transmissive mode, it may be relatively easy to have light source light admixed in the luminescent material light, which may be useful for generating the desirable spectral power distribution. In the reflective mode, thermal management may be easier, as a substantial part of the luminescent material may be in thermal contact with a thermally conductive element, like a heatsink or heat spreader. Hence, would any device light escape from the system, in embodiments this may only via transmission through the luminescent body.

In embodiments, a part of the pump light incident on a luminescent body may be transmitted and a part of pump light may be converted to luminescent material light. Hence, in embodiments, the luminescent body may be transparent. Especially the luminescent body may at least be partially transparent for pump light. Hence, in embodiments, the luminescent body may comprise a ceramic body or a single crystalline body.

Especially, scattering may be relatively low. In embodiments, at maximum 30%, such as at maximum 20%, more especially at maximum 10% of the pump light may undergo scattering (assuming a single pass and an optical axis perpendicular to a (main) face of the luminescent body (see also above)). Embodiments of the luminescent material are described below.

In embodiments, 5-95%, such as 10-90%, such as 20-85% of the total radiant flux of the pump light may be absorbed by the luminescent body in a single pass through the luminescent body. In specific embodiments, the luminescent body may be configured such that (under perpendicular radiation with the pump light) in the range of 30-80% of a total radiant flux of the pump light may be absorbed by the luminescent body in a single pass through the luminescent body. Further, in embodiments, 30-70%, such as 30-60%, such as 30-50% of the total radiant flux of the pump light may be absorbed by the luminescent body in a single pass through the luminescent body. The absorbed pump light may be converted into luminescent material light.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$).

In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence.

The term "luminescent material" may also refer to a plurality of different luminescent materials. Examples of possible luminescent materials are indicated below. Hence, the term "luminescent material" may in specific embodiments also refer to a luminescent material composition. Instead of the term "luminescent material" also the term "phosphor" may be applied. These terms are known to the person skilled in the art.

In embodiments, luminescent materials are selected from garnets and nitrides, especially doped with trivalent cerium or divalent europium, respectively. The term "nitride" may also refer to oxynitride or nitridosilicate, etc. Alternatively or additionally, the luminescent material(s) may be selected from silicates, especially doped with divalent europium.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B may comprise aluminum (Al); however, in addition to aluminum, B may also partly comprise gallium (Ga) and/or scandium (Sc) and/or indium (In), especially up to about 20% of B, more especially up to about 10% of B (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq 0.2$, wherein $y1+y2=1$, wherein $0\leq y2\leq 0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially x1>0, such as >0.2, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (optionally in combination with (the) light of other sources of light as described herein). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein 0<x2+x3≤0.1, and wherein 0≤y2≤0.1. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein x1+x3=1, and wherein 0<x3≤0.2, such as 0.001-0.1.

In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga, In and Sc, wherein x1+x2+x3=1, wherein x3>0, wherein 0<x2+x3≤0.2, wherein y1+y2=1, wherein 0≤y2≤0.2. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

Alternatively or additionally, wherein the luminescent material may comprises a luminescent material of the type $A_3Si_6N_{11}:Ce^{3+}$, wherein A comprises one or more of Y, La, Gd, Tb and Lu, such as in embodiments one or more of La and Y.

In embodiments, the luminescent material may alternatively or additionally comprise one or more of $MS:Eu^{2+}$ and/or $M_2Si_5N_8:Eu^{2+}$ and/or $MAlSiN_3:Eu^{2+}$ and/or $Ca_2AlSi_3O_2N_5:Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, $(Ba,Sr,Ca)AlSiN_3:Eu$ and $(Ba,Sr,Ca)_2Si_5N_8:Eu$. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3:Eu$, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8:Eu$ can also be indicated as $M_2Si_5N_8:Eu$, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8:Eu$ (i.e. 75% Ba; 25% Sr). Here, Eu is introduced and replaces at least part of M, i.e. one or more of Ba, Sr, and Ca). Likewise, the material $(Ba,Sr,Ca)AlSiN_3:Eu$ can also be indicated as $MAlSiN_3:Eu$, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca) $AlSiN_3:Eu$ and $(Ba,Sr,Ca)_2Si_5N_8:Eu$. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3:Eu$, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8:Eu$ can also be indicated as $M_2Si_5N_8:Eu$, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material (Ba, Sr, Ca) $AlSiN_3$:Eu can also be indicated as $MAlSIN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$: $Ce^{3+}$), or similar compounds, or BAM ($BaMgAl_{10}O_{17}$: $Eu^{2+}$), or similar compounds.

The term "luminescent material" herein especially relates to inorganic luminescent materials.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

Yet further, in embodiments, the light generating system may comprise additional optical elements that modify the quality or properties of the system light provided. Especially, the light generating system may comprise an optical element downstream of the reflective polarizer. Such an optical element may be referred to as a downstream optical element. The downstream optical element may in embodiments comprise one or more of a depolarizer, a beam shaping element, a lens and a diffuser. In embodiments, the depolarizer may remove the polarization of the system light such that the system light no longer has a single orientation (or direction) of polarization. Further, the downstream optical element may comprise a beam shaping element such as a hollow reflector or a collimator body, which may facilitate providing a parallel, a diverging or even a focused beam of light. Yet further, the downstream optical element may comprise a diffuser, which may provide diffused system light. The terms "optical element" or "downstream optical element" may also refer to a plurality of such elements, respectively.

In further embodiments, additional optical elements that may be reflective for luminescent material light may be configured upstream of the luminescent body. Hence, the luminescent material light reflected upstream of the luminescent body may undergo a subsequent reflection at the said optical elements and hence, be reflected back towards the luminescent body. Further, the luminescent body may especially be transmissive for luminescent material light. Hence, in this way, the amount of luminescent material light outcoupled from the light generating system (i.e. the amount of luminescent material light comprised by the system light) may be increased. Such additional optical element, especially a reflector, may be reflective for luminescent material light and transmissive for pump light. This may be achieved by using a dichroic mirror or a (dichroic) mirror with a (pin)hole for the pump light (see also below).

Hence, pump light may in embodiments be incident on the luminescent body and hence, undergo conversion to luminescent material light. However, a part of the luminescent material light may be reflected in the upstream direction. Therefore, a part of the luminescent material light may not be outcoupled from the light generating system. This may in embodiments be mitigated by configuring a reflective element upstream of the luminescent body. Hence, in embodiments, the light generating system may further comprise a first reflector configured downstream of the first light generating arrangement and upstream of the luminescent body. Especially, the first reflector may be reflective for luminescent material light and transmissive for the pump light. Therefore, in embodiments, the pump light incident on the first reflector may be transmitted via the first reflector to the luminescent body. However, in embodiments, the first reflector may be reflective for luminescent material light. Hence, the luminescent material light reflected upstream may in embodiments be reflected back downstream. Hence, in this way, the intensity of the luminescent material light comprised by the system light may especially be increased. In embodiments, the first reflector may comprise a dichroic filter. Dichroic filters are filters (or reflectors) that may be transmissive for specific wavelengths of light while reflective for others. In specific embodiments, the light generating system comprises a first reflector configured downstream of the first light generating arrangement and upstream of the luminescent body, wherein the first reflector is reflective for luminescent material light and transmissive for the pump light (wherein the first reflector comprises a dichroic filter). Additionally or alternatively, in embodiments, the first reflector may comprise a pinhole. Especially, the pinhole may be a small opening in the first reflector via which a narrow beam of pump light may be propagated without contacting the first reflector. Hence, in this way, the pump light may be incident on the luminescent body without being obstructed by the first reflector. Moreover, the pinhole may in embodiments be sufficiently small, such that the luminescent material light reflected upstream by luminescent body may be subsequently reflected by the first reflector (with minimal loss of luminescent material light via the pinhole). In specific embodiments, the first reflector comprises a first pinhole, wherein the first light generating arrangement is configured to irradiate the luminescent body with the pump light via the first pinhole.

In embodiments, the spectral power distribution of the system light may be varied by configuring additional light generating arrangements. In embodiments, the light generating system may further comprise a second light generating arrangement configured to generate second arrangement light having a spectral power distribution different from the pump light and different from the luminescent material light. Especially, the second light generating arrangement may comprise a second solid state light source selected from the group comprising a superluminescent diode and a laser diode. Note that in embodiments, many different combinations of configuring the second light generating arrangement may be possible. In further embodiments, the second light generating arrangement may comprise two or more different second solid state light sources. In some embodiments, the second arrangement light may be directly outcoupled without an interaction with the luminescent body or the reflective polarizer. Hence, in this way, the second arrangement light may especially bypass the luminescent body or the reflective polarizer. However, in other embodiments, it may also be possible to provide the second arrangement light following an interaction especially in terms or reflection and/or transmission with the luminescent body and/or the reflective polarizer.

In embodiments, the second light generating arrangement may be configured to bypass with at least part of its second arrangement light the luminescent body and the reflective polarizer. This may in embodiments be achieved by means of an optical element (for example a dichroic filter) which may be transmissive for pump light (and luminescent material light) but may be reflective for second arrangement light. Hence, in embodiments, by configuring the optical element downstream of the luminescent body and the reflective polarizer, the optical element may facilitate the transmission of pump light and luminescent material light. However, the second light generating arrangement may especially be configured such that the second arrangement light may be reflected in the direction of the pump light and hence, bypass the luminescent body and the reflective polarizer.

Alternatively, in embodiments, the second light generating arrangement may be configured upstream of the luminescent body and the reflective polarizer. Furthermore, in such an embodiment, the second arrangement light may be outcoupled from the light generating system without bypassing the luminescent body and the optical reflector. Especially, the luminescent body may be transmissive for at least part of the second arrangement light. Furthermore, the reflective polarizer may especially be transmissive for at least part of the second arrangement light. This may especially be facilitated in embodiments when the second arrangement light also comprises light of the first polarization.

Note that as mentioned further above, the control system may especially control the operation of the first light generating arrangement. Similarly, in embodiments, the control system may also control the operation of the second light generating arrangement. Especially, the radiant flux of the second solid state light source may (also) be controlled by the control system. Hence, in this way, one or more of the spectral power distribution, the radiant flux, and the CCT of the system light may especially by controlled further by controlling (also) the second light generating arrangement. Therefore, in specific embodiments, the light generating system may further comprise a second light generating arrangement, configured to generate second arrangement light having a spectral power distribution different from the pump light and different from the luminescent material light; wherein the second light generating arrangement comprises a second solid state light source selected from the group comprising a superluminescent diode and a laser diode; wherein the control system is configured to control spectral properties of the system light by controlling the polarization of the pump light and by controlling the second light generating arrangement.

Hence, in embodiments comprising the first reflector, the first reflector may comprise a second pinhole. Especially, the second light generating arrangement may be configured to irradiate the luminescent body with the second arrangement light via the second pinhole. In this way, the second arrangement light may be incident on the luminescent body without contacting the first reflector (as indicated above).

In embodiments, the second arrangement light may comprise polarized light comprising the first polarization.

In embodiments, the first light generating arrangement may be configured to generate pump light having a wavelength in the blue wavelength range. alternatively or additionally, in (such) embodiments, the second arrangement light may comprise spectral intensity in one or more of the green wavelength range and the red wavelength range. Additional features in relation to the wavelength range of the pump light are discussed further below. Hence, in embodiment the first light generating arrangement may be configured to generate blue pump light. In embodiments, the second light generating arrangement may be configured to generate red light. In embodiments, the second light generating arrangement may be configured to generate green light. In embodiments, a primary second light generating arrangement may be configured to generate green light and a secondary second light generating arrangement may be configured to generate red light.

The light generating system may comprise further optics. The term “optics” may especially refer to (one or more) optical elements. Hence, the terms “optics” and “optical elements” may refer to the same items. The optics may include one or more or mirrors, reflectors, collimators, lenses, prisms, diffusers, phase plates, polarizers, diffractive elements, gratings, dichroics, arrays of one or more of the afore-mentioned, etc. Alternatively or additionally, the term “optics” may refer to a holographic element or a mixing rod. In embodiments, the optics may include one or more of beam expander optics and zoom lens optics. See further above for examples of optics. In embodiments, the optics may comprise an integrator, like a “Koehler integrator” (or “Köhler integrator”).

The optics may comprise beam shaping elements, such as optical elements selected from a group of a lens, a lens arrangement, a collimator, and a hollow reflector. Here a lens (for example a biconvex lens, plano-convex lens, biconcave lens, etc.) may comprise a transparent material that may shape of beam of light by means of refraction. In embodiments a lens arrangement may especially be a combination of one or more lenses. The collimator and/or the hollow reflector may especially beam shape light to provide a parallel beam of light. Hence, in this way, the first optics and/or the second optics may facilitate beam shaping the pump light. The optics may be configured to shape a beam of system light. Yet, optics may also be used to shape a beam of light from the first light generating device.

The terms “violet light” or “violet emission” especially relates to light having a wavelength in the range of about 380-440 nm. The terms “blue light” or “blue emission” especially relates to light having a wavelength in the range of about 440-495 nm (including some violet and cyan hues). The terms “green light” or “green emission” especially relate to light having a wavelength in the range of about 495-570 nm. The terms “yellow light” or “yellow emission” especially relate to light having a wavelength in the range of about 570-590 nm. The terms “orange light” or “orange emission” especially relate to light having a wavelength in the range of about 590-620 nm. The terms “red light” or “red emission” especially relate to light having a wavelength in the range of about 620-780 nm. The term “pink light” or “pink emission” refers to light having a blue and a red component. The term “cyan” may refer to one or more wavelengths selected from the range of about 490-520 nm. The term “amber” may refer to one or more wavelengths selected from the range of about 585-605 nm, such as about 590-600 nm. The term “visible light” especially relates to light having a wavelength selected from the range of 380-780 nm.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In a yet further aspect, the invention may provide a lighting device selected from the group of a lamp, a luminaire, a projector device, a disinfection device, a photochemical reactor, and an optical wireless communication device comprising the lighting system. The luminaire may further comprise a housing, optical elements, louvres, etc. etc. . . . . The lighting device may further comprise a housing enclosing the lighting generating system. The lighting device may comprise a light window in the housing or a housing opening, through which the light may escape from the housing. In yet a further aspect, the invention also provides a projection device comprising the lighting generating system as defined herein. Especially, a projection device or “projector” or “image projector” may be an optical device that projects an image (or moving images) onto a surface, such as e.g. a projection screen. The projection device may include one or more lighting generating systems such as described herein. Hence, in an aspect the invention also provides a lighting device selected from the group of a lamp, a luminaire, a projector device, a disinfection device, a photochemical reactor, and an optical wireless communication device, comprising the lighting generating system as defined herein. The lighting device may comprise a housing or a carrier, configured to house or support, one or more elements of the lighting generating system. For instance, in embodiments the lighting device may comprise a housing or a carrier, configured to house or support light generating arrangement. In further embodiments, the housing may be configured to house or support one or more optical elements, for example the first reflector, the luminescent body, the reflective polarizer, etc. The luminaire may further comprise a light chamber, optical elements, louvres, etc. The lamp or luminaire may further comprise a light chamber enclosing the lighting system. The lamp or luminaire may comprise a light window (or a radiation exit window) in the light chamber or a light chamber opening, through which the system light may escape from the light chamber. Especially, the lighting device may comprise a laser-phosphor based stage-lighting fixture providing CCT control comprising the herein described light generating system. Further, the invention may provide a lighting device for the stage lighting, stadium lighting, or transport infrastructure lighting.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
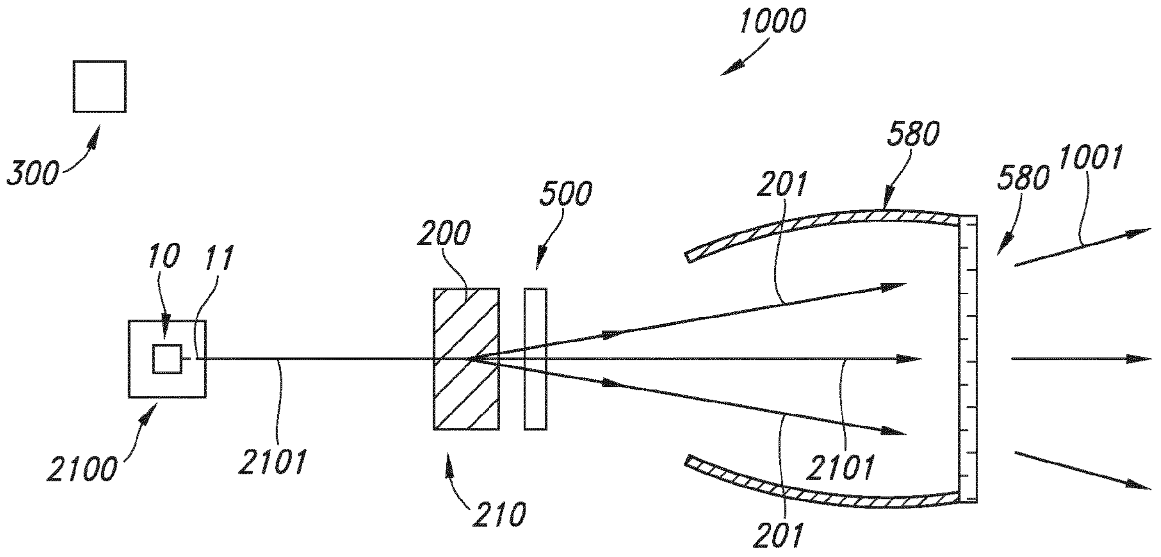
FIG. 1 schematically depicts an embodiment of the light generating system.

FIG. 1 schematically depicts an embodiment of the light generating system 1000 comprising a first light generating arrangement 2100, a luminescent body 210, a reflective polarizer 500, and a control system 300.

In embodiments, the first light generating arrangement 2100 may be configured to generate pump light 2101 having a controllable polarization. Especially, the polarization of the generated pump light 2101 may be varied and the extent of this variation may be controlled (especially by a control system 300). In embodiments, the polarization may be controllable between a first polarization and a second polarization. Further, in embodiments, the first light generating arrangement 2100 may comprise a first solid state light source 10. Especially, the solid state light source 10 may be selected from the group comprising a superluminescent diode and a laser diode. Hence, in this way, these light sources may in embodiments provide a narrow beam of light. In embodiments, the solid state light source 10 may generate light source light 11.

In embodiments, a luminescent body 210 may be configured downstream of the solid state light source 10. Hence, in this way, the generated pump light 2101 escaping the light generating arrangement 2100 (comprising the solid state light source 10) may be incident upon the luminescent body 210. In embodiments, the luminescent body 210 may comprise a luminescent material 200. Features of the luminescent material 200 used in embodiments are discussed further above. Essentially, the luminescent body 210 may convert a part of the generated pump light 2101 into luminescent material light 201. Hence, in embodiments, the luminescent body 210 may be configured to (a) transmit at least part of the pump light 2101 (comprising the first polarization and/or the second polarization) and (b) convert at least part of the pump light 2101 (comprising the first polarization and/or the second polarization) into luminescent material light 201. In summary, the light generating arrangement 2100 may generate pump light 2101, which may subsequently be incident upon the luminescent body 210 and undergo partial conversion such that the light provided downstream of the luminescent body 210 may comprise both pump light 2101 and luminescent material light 201.

In embodiments, the luminescent body may comprises a first face, a second face, and a side face bridging the first face and the second face. The first face may be configured upstream from the second face. Especially, the first face may be directed to the first light generating arrangement 2100. Further, the second face may thus be configured downstream of the first face. Especially, the second face may be directed to the reflective polarizer 500. Especially, light (for example: pump light 2101) transmitted through the luminescent body 210 may especially escape via the second face. Further, light reflected by the luminescent body 210 may especially escape from the first face. In some embodiments, some of the luminescent light may escape via the side face of the luminescent body 210.

Further, in embodiments, the reflective polarizer 500 may be configured downstream of the luminescent body 210. Especially, the reflective polarizer 500 may be transmissive for at least part of the luminescent material light 201. Note that, in embodiments, the reflective polarizer 500 may have a higher transmission for the pump light 2101 comprising the first polarization as opposed to the pump light 2101 comprising the second polarization. Furthermore, in embodiments, the reflective polarizer 500 may have a lower reflectivity for the pump light 2101 comprising the first polarization compared to pump light 2101 comprising the second polarization. Yet further, the reflective polarizer 500 may at least be partly transmissive for luminescent material light 201. Hence, in embodiments, the light provided downstream of the reflective polarizer 500 may comprise a combination of both pump light 2101 and luminescent material light 201. Consequently, the light generating system 1000 may be configured to generate system light 1001, wherein the system light 1001 may comprise the pump light 2101 and the luminescent material light 201.

In embodiments, the control system 300 may be configured to control spectral properties of the system light 1001 by controlling the polarization of the pump light 2101. Further, the control system 300 may be configured to control the system light 1001 in dependence of one or more of an input signal of a user interface, a sensor signal (of a sensor), and a timer. In embodiments, the control system 300 may be configured to control the system light 1001 by controlling the light generating arrangement 2100, such as by controlling one or more of the polarization of the pump light 2101 and the radiant flux of the pump light 2101.

Especially, in specific embodiments the control system 300 may be configured to reduce in an operational mode of the light generating system 1000 a total radiant flux of the pump light 2101 (comprising the first polarization and/or the second polarization) when (also) increasing a relative amount of a second radiant flux of the pump light 2101 comprising the second polarization to the total radiant flux of the pump light 2101. In such an operational mode in embodiments, first, the total radiant flux of the pump light 2101 may be reduced. Hence, in embodiments, the light generating system 1000 may provide the feature of dimming the system light 1001. Furthermore, the total radiant flux of the pump light 2101 may be reduced such that the ratio of the second radiant flux (of the pump light 2101) to the first radiant flux (of the pump light 2101) is increased. Hence, in this way, in embodiments, the spectral power distribution of the light generating system 1000 may be controlled.

A part of the light incident upon the luminescent body 210 may in embodiments be absorbed. A part of the incident light may especially (also) undergo scattering by the luminescent body 210 and a part of the incident light may especially be transmitted. Hence, in embodiments, the luminescent body 210 may at least be partially transmissive for pump light 2101. Hence, in embodiments, the luminescent body 210 may at least be (partially) transparent. Further, in embodiments, the luminescent body 210 may comprise a ceramic body or a single crystalline body.

In embodiments, the first polarization and the second polarization may be selected from p-polarization and s-polarization. Light may especially be polarized along different directions, where s-polarization refers to light that is polarized in a component direction perpendicular to the plane of polarization and p-polarization refers to light that is polarized in a component direction parallel to the plane of polarization. In embodiments, the first solid state light source 10 may comprise a laser diode. Note that in embodiments, the laser diode light may be partly or completely polarized.

Further, in embodiments, the control system 300 may be configured to control in an operational mode of the light generating system 1000 the correlated color temperature of the system light 1001 by controlling relative amounts of (a) the first radiant flux of the pump light 2101 comprising the first polarization and (b) a second radiant flux of the pump light 2101 comprising the second polarization to a total radiant flux of the pump light 2101. Hence, in this way, by altering the ratio of the first radiant flux of the pump light 2101 to the second radiant flux of the pump light 2101, the CCT of the system light 1001 may especially be controlled. See further also FIGS. 2*a*-2*d*.

In embodiments, the light generating system 1000 may further comprise a downstream optical element 580 comprising one or more of a depolarizer, a beam shaping element, a lens, and a diffuser. Especially, the downstream optical element 580 may be configured downstream of the reflective polarizer 500. In embodiments, the light incident on the depolarizer may scramble the polarization of light and may hence no longer be polarized. Furthermore, the beam shaping element may especially comprise a hollow reflector or a collimator which may especially facilitate the beam shaping the light incident upon it (i.e. the pump light 2101 and/or the luminescent material light 201). Further, in embodiments, the optical element 580 may also comprise a diffuser, wherein the light incident upon the diffuser may especially undergo scattering and hence, diffuse system light 1001 may be provided. Hence, in this way, the optical element 580 may especially be used to alter the quality of the system light 1001 provided.

In embodiments, the luminescent body 210 may be configured such that (under perpendicular radiation with the pump light 2101) in the range of 30-80% of a total radiant flux of the pump light 2101 may be absorbed by the luminescent body 210 in a single pass through the luminescent body 210. As mentioned above, the luminescent body 210 may especially absorb a part of the total radiant flux of the pump light 2101, wherein the extent of absorption may depend on the thickness of the luminescent body 210. That is, in embodiments, a thicker luminescent body 210 may absorb a larger amount of the total radiant flux of the pump light 2101. Furthermore, in embodiments, the extent of absorption of the total radiant flux of the pump light 2101 may be dependent on the luminescent material 200 comprised by the luminescent body 210. Especially, the luminescent material 200 may comprise a luminescent material of the type $A_3B_5O_{12}$:Ce, wherein A comprises one or more of Y, La, Gd, Tb and Lu, and wherein B comprises one or more of Al, Ga, In and Sc. In specific embodiments, the luminescent body 210 may especially convert light having a wavelength in the blue wavelength range. Hence, in embodiments, the first light generating arrangement 2100 may especially be configured to generate pump light 2101 having a wavelength in the blue wavelength range.

Figure 2A:
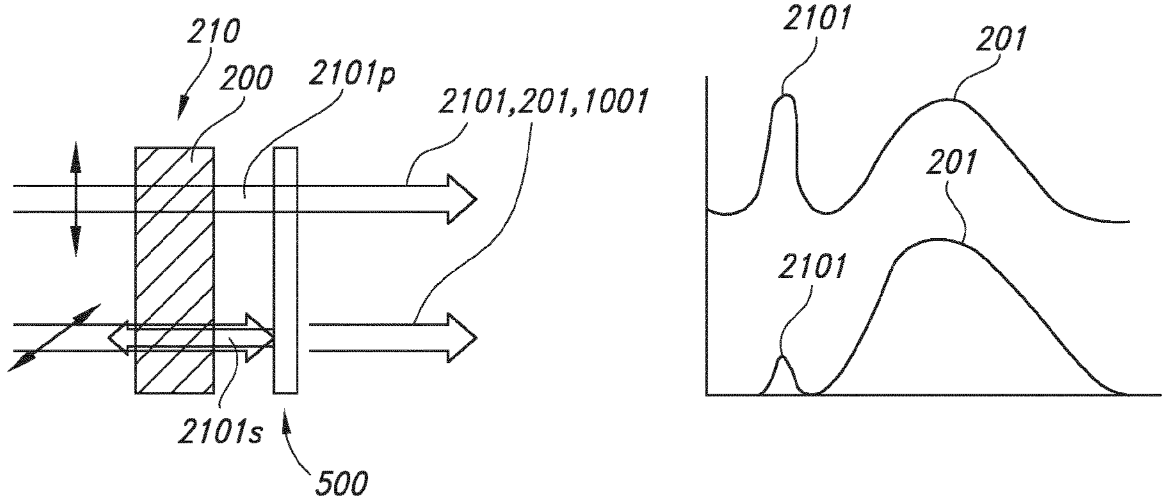
FIG. 2*a-d* schematically depict embodiments comprising different configurations of the light generating system 1000, and FIG. 3 schematically depicts an embodiment of an application.

FIG. 2*a* depicts the functioning of an embodiment of the light generating system 1000 especially with respect to the configuration of the reflective polarizer 500. In FIG. 2*a* (left), pump light 2101 comprising both the first polarization and the second polarization may be incident on the luminescent body 210. Especially, the first polarization and the second polarization may be selected from p-polarization 2101*p* and s-polarization 2101*s*. As mentioned before, the luminescent body 210 may in embodiments be (at least partially) transparent (for the pump light 2101). Hence, in embodiments, a part of the pump light 2101 may undergo conversion to the luminescent material light 201 and the part of the pump light 2101 may remain unconverted. As indicated in the figure, the p-polarized pump light 2101*p* and the luminescent material light 201 may subsequently be incident on the reflective polarizer 500. In embodiments, the reflective polarizer 500 may be reflective for s-polarized light and transmissive for p-polarized light. Therefore, the spectral power distribution of the system light 1001 may comprise peak intensities for p-polarized pump light 2101*p* and luminescent material light 201 as indicated in the spectral distribution in FIG. 2*a* (right). Additionally, in embodiments, the pump light 2101 may (also) comprise s-polarized pump light 2101*s*. Especially, the s-polarized pump light 2101*s* may be incident on the luminescent body 210 and a part of the s-polarized pump light 2101*s* may undergo conversion to luminescent material light 201 and part of the s-polarized pump light 2101*s* may remain unconverted. Further, in embodiments, s-polarized pump light 2101*s* may undergo partial depolarization due to scattering of light within the luminescent body 210. The light outcoupled from the luminescent body 210 may especially be incident on the reflective polarizer 500 configured further downstream (of the luminescent body 210). As mentioned above, the reflective polarizer 500 may in embodiments be reflective for s-polarized light. Hence, the s-polarized pump light 2101*s* may be reflected upstream (back) towards the luminescent body 210. This reflected s-polarized pump light 2101*s* may in embodiments undergo a subsequent conversion to luminescent material light 201 and may be scattered in the direction of the reflective polarizer 500. Hence, in this way, the s-polarized pump light 2101*s* may undergo conversion to luminescent material light 201. Moreover, the part of the pump light 2101 not comprising s-polarization may in embodiments (at least partly) be transmitted via the reflective polarizer 500. Hence, the spectral power distribution in such a scenario may comprise pump-light 2101 having zero or minimal intensity of p-polarized pump light 2101*p* (due to partial scattering and depolarization of the s-polarized pump light 2101*s*) and the spectral distribution may only show peak intensity for luminescent material light 201 (see FIG. 2*a* (right)). Especially, the intensity of luminescent material light 201 converted from s-polarized pump light 2101*s* may be higher than the intensity of luminescent material light 201 converted from p-polarized pump light 2101*p*; since s-polarized pump light 2101*s* may undergo conversion multiple times (as described above).

Figure 2B:
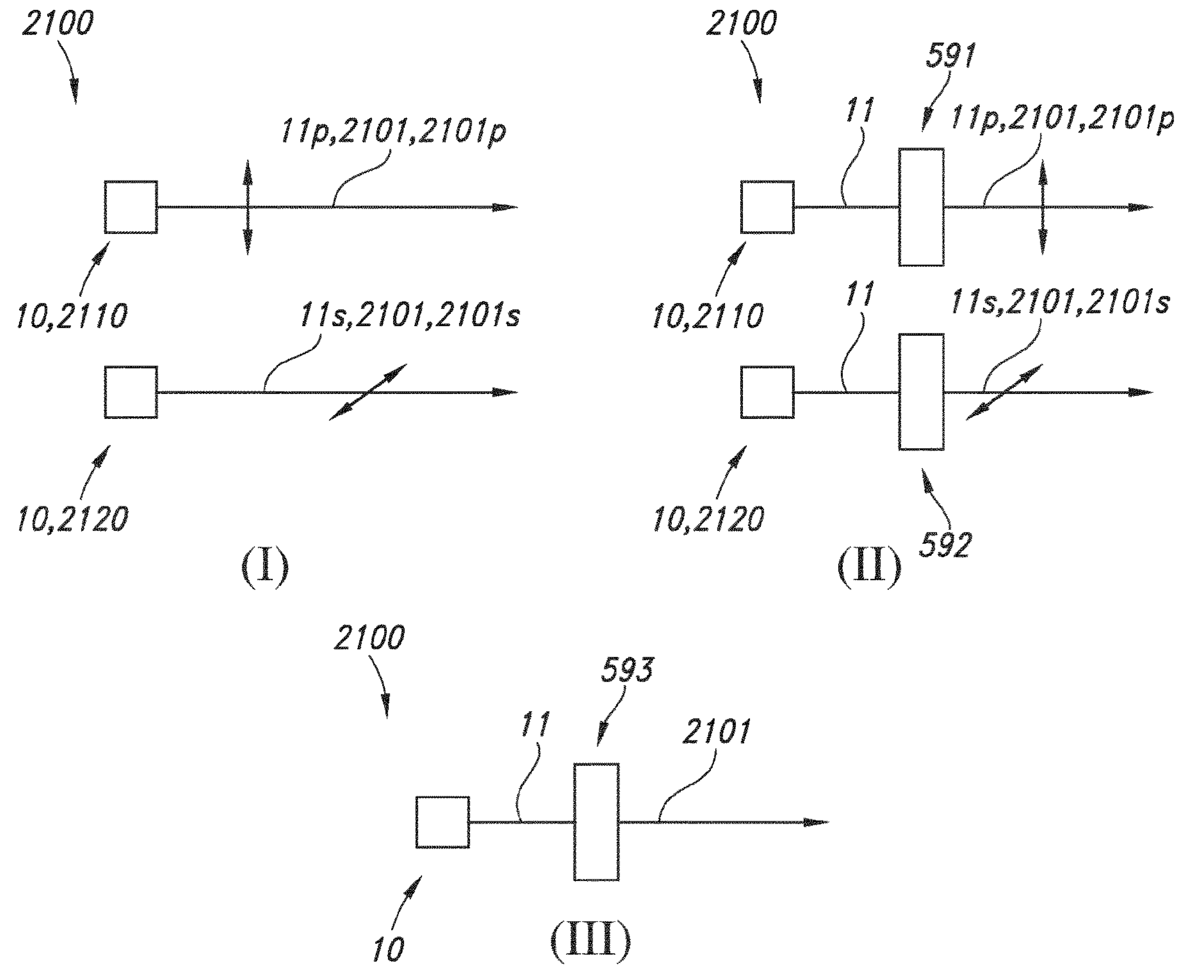

FIG. 2*b* depicts embodiments of a light generating arrangement 2100 configured to generate pump light 2101. Especially, embodiment I depicts an embodiment comprising two different light sources 10, herein also indicated with references 2110,2120, configured to generate p-polarized pump light 2101*p* and s-polarized pump light 2101*s*, respectively. Hence, the p-polarized pump light 2101*p* may comprise p-polarized light source light 11*p* and the s-polarized pump light 2101*s* may comprise the s-polarized light source light 11*s*. Hence, in this way, pump light 2101 of two different polarizations may be generated. This may also facilitate controlling a ratio of the pump light 2101*p*,2101*s* with the respective different polarizations.

Alternatively, as depicted in FIG. 2*b* embodiment II, the first light generating arrangement 2100 may comprise (different) light sources 10, which may not provide the already desired polarized light. These light sources are herein also indicated with reference 2110,2120. Especially, the first pump light source 2110, optionally in combination with first optics 591, may be configured to generate the pump light 2101 comprising the first polarization, i.e. p-polarized pump light 2101*p*. Furthermore, in embodiments the second pump light source 2120, may optionally in combination with second optics 592 be configured to generate the pump light 2101 comprising the second polarization, i.e. s-polarized pump light 2101*s*. Hence, in this way, pump light 2101 of two different polarizations may be generated.

Yet further, embodiment III (depicted in FIG. 2*b*) depicts the first light generating arrangement 2100 comprising light source 10. In embodiments, the light source 10 generates light source light 11. Especially, the light source light 11 may be incident on third optics 593, wherein the light source light 11 may be polarized by the third optics to provide pump light 2101. The third optics 593 may be able to control the polarization of the pump light 2101 into one or more of the first polarization and the second polarization.

Figure 2C:
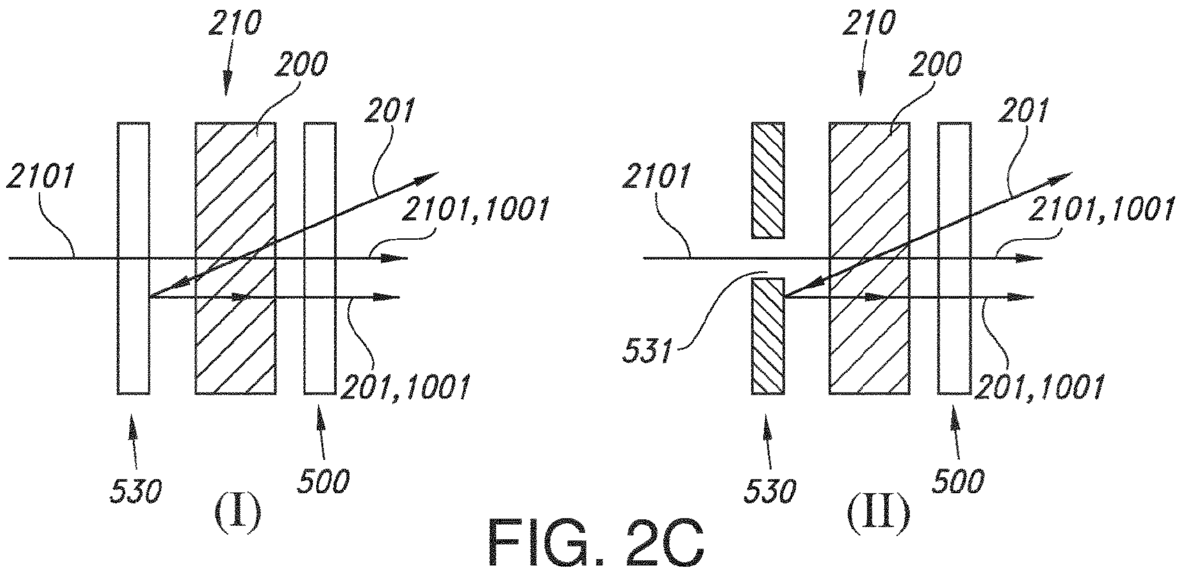

FIG. 2*c* schematically depicts embodiments of the light generating system 1000 comprising the first reflector 530. Especially, the first reflector 530 may be configured downstream of the first light generating arrangement 2100 (not depicted) and upstream of the luminescent body 210. Especially, the first reflector 530 may be reflective for luminescent material light 211 and transmissive for the pump light 2101. In embodiments, the first reflector 530 may comprise a dichroic filter. The operation of such embodiments is illustrated in two embodiments. In embodiment I, the first reflector 530 may be transmissive for pump light 2101. Hence, especially, pump light 2101 may be transmitted via the first reflector 530 and be incident on the luminescent body 210. In embodiments, a part of the pump light 2101 may remain unconverted and may be incident on the reflective polarizer 500 (which may be configured to be transmissive for a specific polarization angle (for example p-polarization or s-polarization)). Hence, in embodiments, pump light 2101 may be outcoupled. In embodiments, a part of the pump light 2101 incident on the luminescent body 210 may undergo conversion to luminescent material light 201, some of which may be transmitted (through the luminescent body)

and be outcoupled via the reflective polarizer 500, while a part of the luminescent material light 201 may be reflected upstream onto the first reflector 530. In embodiments, the luminescent material light 201 incident on the first reflector 530 may be reflected (back) downstream in the direction of the luminescent body 210, wherein at least a part of the luminescent material light 201 may be outcoupled via the reflective polarizer 500. Hence, in such an embodiment, the luminescent material light 201 outcoupled may be increased by using the first reflector 530 (which may be reflective for luminescent material light 530). In this embodiment, the reflector 530 may e.g. be a dichroic filter, transmissive for the pump light 2101 but reflective for the luminescent material light 201.

Alternatively, in embodiment II, the first reflector 530 may (also) comprise a first pinhole 531. The first pinhole 531 in embodiments may provide the benefit of not obstructing the path of the pump light 2101. In embodiments, the first light generating arrangement 2100 may be configured to irradiate the luminescent body 210 with the pump light 2101 via the first pinhole 531. Hence, in this way, the pump light 2101 may be incident on the luminescent body 210 without an interaction with other elements comprised by the light generating system 1000. Further, in embodiments, the pump light 2101 may undergo partial conversion to luminescent material light 201, and both pump light 2101 and luminescent material light 201 may be provided. Further, a part of luminescent material light 201 may be outcoupled following a subsequent reflection at the first reflector 530. The first reflector 530 may be a dichroic filter, but may especially be a simple reflector, such as having a metallic coating, like an Al coating.

Figure 2D:
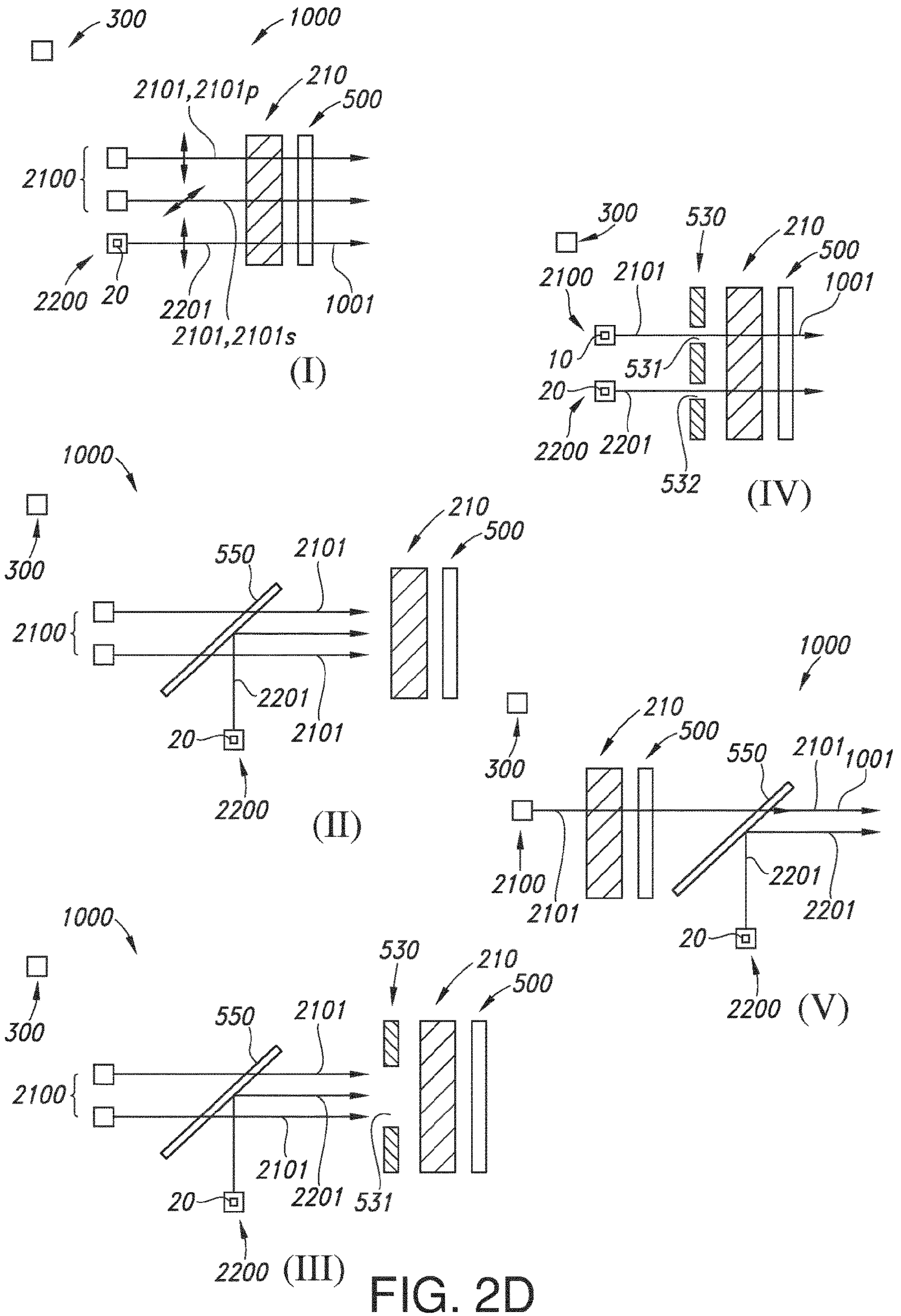

FIG. 2*d* schematically depicts embodiments of the light generating system 1000 further comprising a second light generating arrangement 2200. Especially, the second light generating arrangement 2200 may be configured to generate second arrangement light 2201 having a spectral power distribution different from the pump light 2101 and different from the luminescent material light 201. Hence, in this way, the spectral power distribution of the system light 1001 may in embodiments be further controlled (or varied). In embodiments, the second light generating arrangement 2200 may comprise a second solid state light source 20 selected from the group comprising a superluminescent diode and a laser diode. Further, in embodiments, the control system 300 may be configured to control spectral properties of the system light 1001 by controlling the polarization of the pump light 2101 and by controlling the second light generating arrangement 2200 (as shown in embodiments I-V).

In embodiments, the second arrangement light 2201 may comprise spectral intensity in one or more of the green wavelength range and the red wavelength range.

As mentioned before, the control system 300 may control the intensity of the one or more light generating arrangements 2100, 2200. Hence, in this way, the control system 300 may vary or control the spectral power distribution of the system light 1001 outcoupled.

In embodiment I depicted in FIG. 2*d*, the second light generating system 2200 is configured upstream of the luminescent body 210. In embodiments, the luminescent body 210 may be transmissive for at least part of the second arrangement light 2201. Further, in embodiments, the reflective polarizer 500 may (also) be transmissive for at least part of the second arrangement light 2201. Furthermore, in embodiments, the second arrangement light 2201 may comprise polarized light comprising the first polarization. However, in other embodiments, the second arrangement light 2201 may (also) comprise polarized light comprising the second polarization as depicted in embodiment I.

In embodiment II depicted in FIG. 2*d*, the second light generating arrangement 2200 may be configured in a different spatial location than the first light generating arrangement 2100. In this way, in embodiments, the pump light 2101 may (also) be directed in a different direction than the second arrangement light 2201. In the embodiment depicted, a partially transmissive optical element 550 (for example a dichroic mirror) may be configured upstream of the luminescent body 210. The optical element 550 may in embodiments be transmissive for pump light 2101. Therefore, in this way, the pump light 2101 incident on the optical element 550 may be transmitted through the optical element 550 and may be incident on the luminescent body 210 (and subsequently on the reflective polarizer 500). Yet further, in embodiments, the second arrangement light 2201 may also be incident upon the optical element 550. However, the optical element 550 may in embodiments be reflective for the second arrangement light 2201. Especially, the second arrangement light 2201 may be reflected by the optical element 550 in the direction of the luminescent body 210 (and subsequently the reflective polarizer 500).

Embodiment III depicted in FIG. 2*d* may comprise similar features as described in embodiment II. For the sake of brevity, these features are not repeated. Embodiment III differs from embodiment II in that the first reflector 530 may be configured upstream of the luminescent body 210 and the reflective polarizer 500. Furthermore, in embodiments, the first reflector 530 may comprise the pinhole 531. Especially, the pump light 2101 and the second arrangement light 2201 may be incident on the luminescent body 210 without contacting the first reflector 530. In such embodiments, the converted luminescent material light 201 may be reflected by the first reflector 530 in the downstream direction. Hence, in this way, the intensity of luminescent material light 201 comprised by the system light 1001 may be increased.

Embodiment IV depicted in FIG. 2*d* depicts an embodiment comprising the first reflector 530 further comprising the first pinhole 531 and an additional second pinhole 532. In such an embodiment, the light generating system 1000 may comprise the first light generating arrangement 2100 and the second light generating arrangement 2200, wherein the pump light 2101 may be incident on the luminescent body 210 via the first pinhole 531. Further, in embodiments, the second arrangement light 2201 may be incident on the luminescent body 210 via the second pinhole 532. Hence, in this way, the pump light 2101 and the second arrangement light 2201 may both be incident on the luminescent body 210 without contacting any other elements. Furthermore, the first reflector 530 may provide the advantage of reflecting the luminescent material light 201, and thus, increasing the intensity of the luminescent material light 201 comprised by the system light 1001.

In embodiment V depicted in FIG. 2*d*, the second light generating arrangement 2200 may be configured to bypass with at least part of its second arrangement light 2201 the luminescent body 210 and the reflective polarizer 500. Hence, in such an embodiment, the light generating arrangement 2100 may generate pump light 2101 which may be incident on the luminescent body 210 (and subsequently on the reflective polarizer 500). Further, in embodiments, the optical element 550 may be configured further downstream of the reflective polarizer 500, wherein the reflective polarizer 500 may be transmissive for pump light 2101. Hence, in this way, system light 1001 comprising pump light 2101 may especially be provided. Yet further, the light generating system 100 may further comprise the second light generating arrangement 2200 which may provide second arrangement light 2201. Especially, the second arrangement light 2201 may be incident on the optical element 550. In embodiments, the optical element 550 may be reflective for the second arrangement light 2201, and hence, the second arrangement light 2201 may be reflected in the direction of the pump light 2101. Hence, system light 1001 comprising a combination of pump light 2101, second arrangement light 2201 and luminescent material light 201 may be provided. Especially, in the embodiment depicted, the optical element 550 may be configured downstream of the reflective polarizer 500 and hence, the second arrangement light 2201 may be provided such that it may bypass the luminescent body 210 and the reflective polarizer 500.

Figure 3:
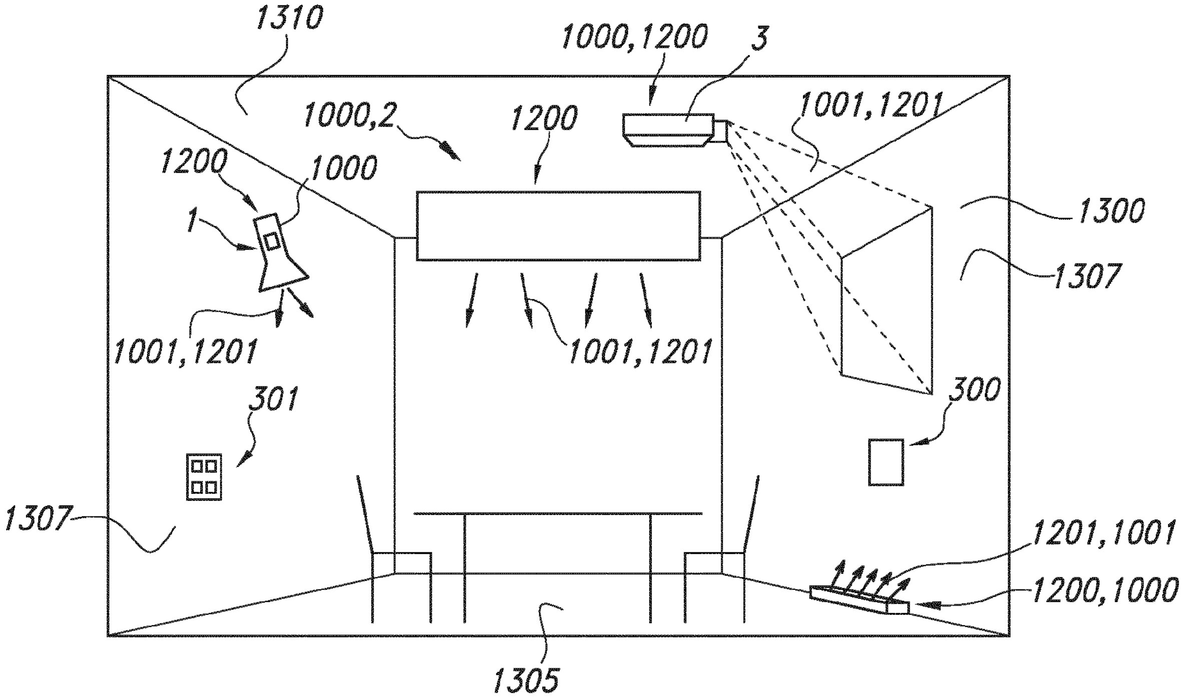

FIG. 3 schematically depicts an embodiment of a lighting device 1200. In embodiments, a lighting device 1200 may be selected from the group of a lamp 1, a luminaire 2, a projector device 3, a disinfection device, a photochemical reactor, and an optical wireless communication device, comprising the lighting system 1000 as described herein. Reference 301 indicates a user interface which may be functionally coupled with the control system 300 comprised by or functionally coupled to the lighting system 1000. The figure also schematically depicts an embodiment of lamp 1 comprising the lighting system 1000. Reference 3 indicates a projector device or projector system, which may be used to project images, such as at a wall, which may also comprise the lighting system 1000. In embodiments, such a lighting device may be a lamp 1, a luminaire 2, a projector device 3, a disinfection device, or an optical wireless communication device. Lighting device light escaping from the lighting device 1200 is indicated with reference 1201. Lighting device light 1201 may essentially consist of system light 1001, and may in specific embodiments thus be system light 1001. Reference 1300 indicates a space, such as an office or a living room, wherein the reference 1307 corresponds to the walls of the living room and reference 1305 corresponds to the floor.

The term "plurality" refers to two or more. The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. The term "comprise" also includes embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species". Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein. The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system. The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a first light generating arrangement, a luminescent body, a reflective polarizer, and a control system; wherein:

the first light generating arrangement is configured to generate pump light having a controllable polarization, wherein the polarization is controllable between a first polarization and a second polarization; wherein the first light generating arrangement comprises a first solid state light source selected from the group comprising a superluminescent diode and a laser diode;

the luminescent body is configured downstream of the first light generating arrangement and, during operation of the light generating system, the pump light generated by the first light generating arrangement is incident on the luminescent body;

the luminescent body comprises a luminescent material; wherein the luminescent body is configured to transmit at least part of the pump light and convert at least part of the pump light into luminescent material light;

the reflective polarizer is configured downstream of the luminescent body; wherein the reflective polarizer is transmissive for at least part of the luminescent material light; wherein the reflective polarizer has a higher transmission for the pump light comprising the first polarization than for the pump light comprising the second polarization, wherein the reflective polarizer has a lower reflectivity for the pump light comprising the first polarization than for the pump light comprising the second polarization;

the light generating system is configured to generate system light; the system light is white light having a correlated color temperature in a range from 1800 K to 10000 K and a color rendering index of at least 70;

the control system is configured to control spectral properties of the system light by controlling the polarization of the pump light;

in a first operational mode of the light generating system the system light comprises a first radiant flux ratio $X_1/Y_1$ of the pump light and the luminescent material light, wherein in a second operational mode of the light generating system the system light comprises a second radiant flux ratio $X_2/Y_2$ of the pump light and the luminescent material light, and wherein $X_1/Y_1>X_2/Y_2$; and wherein the luminescent body is at least partially transparent for the pump light.

2. The light generating system according to claim 1, wherein the control system is configured to reduce in an operational mode of the light generating system a total radiant flux of the pump light when increasing a relative amount of a second radiant flux of the pump light comprising the second polarization to the total radiant flux of the pump light.

3. The light generating system according to claim 1, wherein $X_1/Y_1 \geq 1.2*X_2/Y_2$; and wherein the luminescent body is transparent.

4. The light generating system according to claim 1, wherein the luminescent body comprises a ceramic body or a single crystalline body; wherein the first polarization and the second polarization are selected from s-polarization and p-polarization; wherein the first solid state light source comprises a laser diode; wherein the control system is configured to control in an operational mode of the light generating system the correlated color temperature of the system light by controlling relative amounts of the first radiant flux of the pump light comprising the first polarization and the second radiant flux of the pump light comprising the second polarization to a total radiant flux of the pump light; wherein the light generating system further comprises a downstream optical element comprising one or more of a depolarizer, a beam shaping element, and a diffuser, wherein the downstream optical element is configured downstream of the reflective polarizer.

5. The light generating system according to claim 1, wherein the luminescent body is configured such that in the range of 30-80% of a total radiant flux of the pump light is absorbed by the luminescent body in a single pass through the luminescent body.

6. The light generating system according to claim 1, wherein the luminescent material comprises a luminescent material of the type $A_3B_5O_{12}$:Ce, wherein A comprises one or more of Y, La, Gd, Tb and Lu, and wherein B comprises one or more of Al, Ga, In and Sc; and wherein the first light generating arrangement is configured to generate pump light having a wavelength in the blue wavelength range.

7. The light generating system according to claim 1, wherein the first light generating arrangement comprises a first pump light source and a second pump light source; wherein the first pump light source, optionally in combination with first optics, is configured to generate the pump light comprising the first polarization, and wherein the second pump light source, optionally in combination with second optics, is configured to generate the pump light comprising the second polarization.

8. The light generating system according to claim 1, further comprising a first reflector configured downstream of the first light generating arrangement and upstream of the luminescent body, wherein the first reflector is reflective for luminescent material light and transmissive for the pump light.

9. The light generating system according to claim 8, wherein the first reflector comprises a first pinhole, wherein the first light generating arrangement is configured to irradiate the luminescent body with the pump light via the first pinhole.

10. The light generating system according to claim 1, further comprising a second light generating arrangement, configured to generate second arrangement light having a spectral power distribution different from the pump light and different from the luminescent material light; wherein the second light generating arrangement comprises a second solid state light source selected from the group comprising a superluminescent diode and a laser diode; wherein the control system is configured to control spectral properties of the system light by controlling the polarization of the pump light and by controlling the second light generating arrangement.

11. The light generating system according to claim 10, wherein the second light generating arrangement is configured to bypass with at least part of its second arrangement light the luminescent body and the reflective polarizer.

12. The light generating system according to claim 10, wherein the second light generating arrangement is configured upstream of the luminescent body, wherein the luminescent body is transmissive for at least part of the second arrangement light, and wherein the reflective polarizer is transmissive for at least part of the second arrangement light.

13. The light generating system according to claim 12, wherein the second arrangement light comprises polarized light comprising the first polarization.

14. The light generating system according to claim 10, wherein the second arrangement light comprises spectral intensity in one or more of the green wavelength range and the red wavelength range.

15. A lighting device selected from the group of a lamp and a luminaire, comprising the light generating system according to claim 1.

* * * * *